Nov. 15, 1938.  H. A. SMITH  2,136,763
HEATING PLATE STRUCTURE
Filed Sept. 18, 1935  2 Sheets-Sheet 1
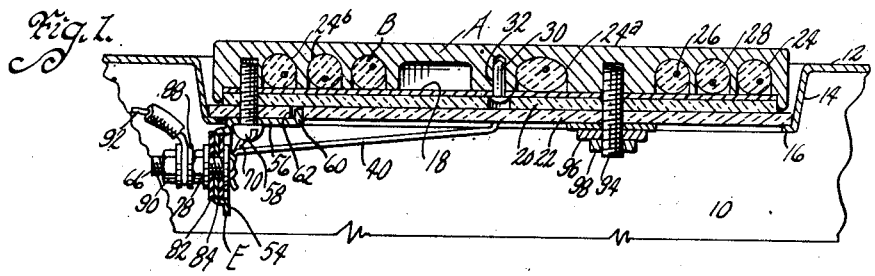
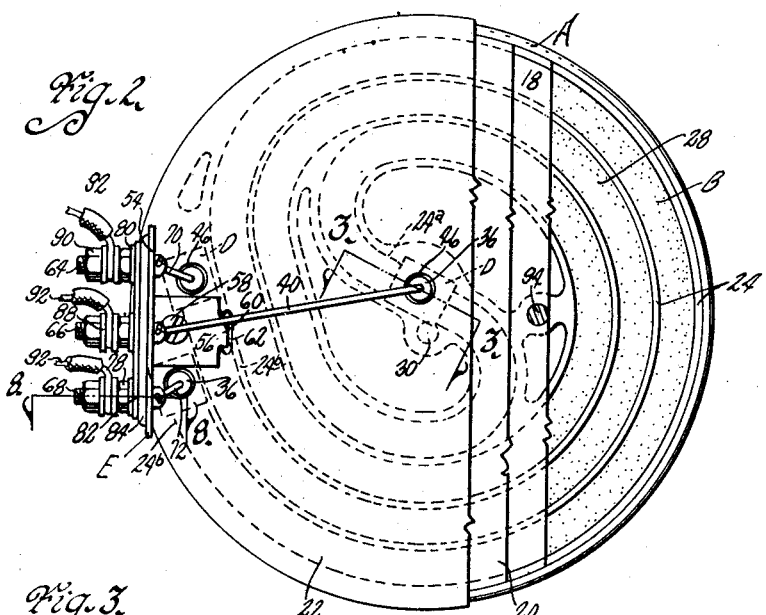
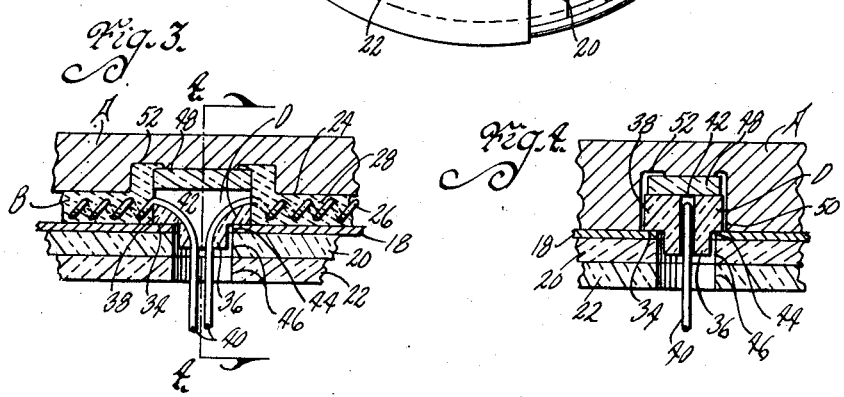
Inventor
Howard Smith
By Bair, Freeman & Sinclair
Attorneys
Witness
Edw. Seeley

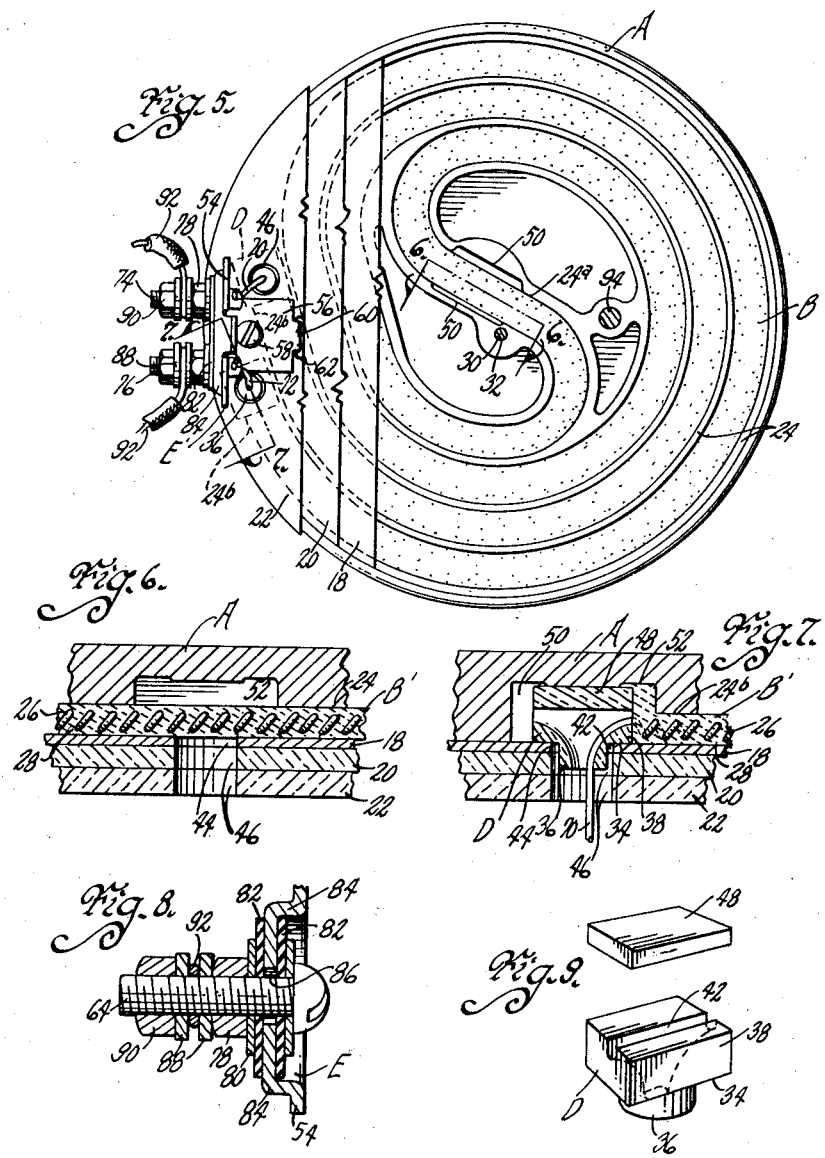

Patented Nov. 15, 1938

2,136,763

UNITED STATES PATENT OFFICE 2,136,763

HEATING PLATE STRUCTURE

Howard A. Smith, St. Louis, Mo., assignor to Knapp-Monarch Company, St. Louis, Mo., a corporation of Missouri Application September 18, 1935, Serial No. 41,085

7 Claims. (Cl. 219—37)

The object of my invention is to provide a heating plate structure which is simple, durable and comparatively inexpensive to manufacture.

A further object is to provide an electric heating plate structure for a stove or the like having a heating element groove so arranged therein that either a two heat or a three heat plate can be provided, depending on how the wires are connected with the heating element in the groove, and yet the entire surface of the plate can be evenly heated whether one or the other of the heating elements is being used.

A further object is to provide a heating plate structure comprising a metal plate element having a heating element groove therein, a heating element received in the groove and a cover plate for the heating element and groove whereby when the cover plate is in assembled position, the entire heating plate structure is a unit which can be installed in the frame of a stove or other support.

Still a further object is to provide a terminal support which can be mounted on the heating element plate so that the plate can be mounted in a stove and then suitable circuit connections made therewith as desired.

Another object is to provide a novel means for insulating the end of the heating element where it extends out of the heating element groove.

With these and other objects in view my invention consists in the construction, arrangement and combination of the various parts of my device, whereby the objects contemplated are attained, as hereinafter more fully set forth, pointed out in my claims and illustrated in the accompanying drawings, in which:

Figure 1 is a vertical, central, sectional view through a heating plate structure embodying my invention.

Figure 2 is a bottom plan view of the same, parts thereof being broken away and illustrating a three heat arrangement.

Figure 3 is an enlarged sectional view on the line 3—3 of Figure 2 illustrating an insulating bushing used in connection with the heating element of the stove plate structure.

Figure 4 is a sectional view on the line 4—4 of Figure 3.

Figure 5 is a bottom plan view similar to Figure 2 showing a single heating arrangement.

Figure 6 is an enlarged sectional view on the line 6—6 of Figure 5.

Figure 7 is an enlarged sectional view on the line 7—7 of Figure 5.

Figure 8 is an enlarged view on the line 8—8 of Figure 2 showing a terminal construction; and Figure 9 is a separated perspective view of a pair of insulating elements used in connection with the ends of the heating element.

On the accompanying drawings I have used the reference numeral 10 to indicate generally a stove frame. The top thereof is indicated at 12 and an annular depressed portion is indicated at 14. The portion 14 terminates in an inwardly extending supporting flange 16.

My heating plate structure includes a plate element A, a heating element B, a cover plate 18 and backing sheets 20 and 22 of insulation. These are adapted for support on the flange 16 as shown in Figure 1.

The plate element A is preferably of metal so as to quickly conduct the heat from the heating element B to the surface thereof for cooking purposes. It is provided with a heating element groove 24 which is serpentine in contour, having a central portion at 24a from which the groove extends outwardly to the two ends at 24b. The purpose of this peculiar arrangement will hereinafter appear.

The heating element B comprises a coiled resistance 26 embedded in argillous or ceramic material 28 when the same is plastic after which it is placed in the heating element groove 24 and becomes hardened due to either a baking process or energization of the resistance wire 26.

The heating element B is retained in position by the cover plate 28, a pin 30 being driven through a perforation in the center of the plate and into a socket 32 of the heating plate A and held therein by friction. The packing sheets 20 and 22 are of suitable insulation and are retained in position by the heating plate A resting thereon, the packing sheet 22 being large enough to contact with the flange 16.

Connections with the ends of the resistance wire 26 present a problem of properly insulating the wire against contact with the cover plate 18 or any other metal part of the structure. I have provided, as shown in Figure 3, a bushing D for this purpose. The bushing D is shouldered, the shoulder being indicated at 34 and is provided with a reduced end 36 and an enlarged head 38. The head 38 is rectangular, or any shape other than round, so that it can fit a recess, later to be described, and will be prevented thereby from turning.

The ends of the resistance wires are indicated at 40 and they extend through a groove 42 of the bushing D. The groove has ends substantially at right angles to each other so that the resistance wire extending into the side of the bushing can extend out of the bottom thereof through perforations 44 in the cover plate 18 and 46 of the insulating plates 20 and 22.

To prevent contact of the resistance wire ends 40 with the plate A, I provide a cover piece 48 also of insulation for the open upper part of the slot 42.

As best shown in Figure 5, the plate A is provided with an enlarged recess 50 to receive the head 38 and the cover piece 48 and prevent them from turning. The heating element groove is more deeply recessed as indicated at 52 in Figure 3 to receive the cover piece 48.

I have described the insulating means at the center of the plate in Figure 2 but a similar means is provided at each end 24b of the heating element groove, this being illustrated in Figure 7.

In connection with my heating plate structure, I provide a terminal bracket E comprising a vertical portion 54 and a horizontal portion 56.

A screw 58 extends through the horizontal portion to mount the bracket on the plate A while the portion 56 is provided with an ear 60 (see Figure 1) to enter a slot 62 of the insulated plate 22 to retain the bracket against turning.

In Figure 2 I show three terminals 64, 66 and 68 connected with one end, the center and the other end respectively, of the heating element B by heating element ends 70, 40 and 72 respectively. By forming one-half of the heating element of heavier wire than the other half, connection of electric current to the terminals 64 and 66 will result in a low heat by energizing the light resistance wire; connection to the terminals 66 and 68 will result in an intermediate heat, by energizing the heavier resistance wire; and connection of one current supply wire to the terminals 64 and 68 and the other current supply wire to the terminal 66 will result in a high heat, by energizing both resistance wires connected in parallel.

When either of the resistance wires is energized, its heat will be distributed over the entire surface of the plate A because each heating element extends from the periphery to the center of the plate due to the doubled back arrangement of the groove 24. Obviously, energization of both wires will result in uniform heat distribution also.

In Figure 5, I show a modified terminal support E' designed for two terminals 74 and 76 instead of three as shown in Figure 2. At the center of the plate A the resistance element B' extends across the enlarged recess 50 as shown in Figure 6 instead of being connected and using the bushing D as in Figure 3 for thus centrally tapping the resistance element.

The terminals 64, 66, 68, 74 and 76 are all similar, the one at 64 being shown in Figure 8, which will now be described. It comprises a screw retained by a nut 78 against washers 80 and insulated washers 82. The insulated washers 82 engage shoulders 84 of the bracket portion 54 to retain the screws 64 centered relative to an enlarged perforation 86 in the bracket so that there will be no electrical contact. Washers 88 and a nut 90 serve the purpose of connecting a circuit wire 92 with the terminal 64. There are a plurality of the wires 92 which extend to suitable switches and current supply wires in the ordinary manner.

Some changes may be made in the construction and arrangement of the parts of my device without departing from the real spirit and purpose of my invention, and it is my intention to cover by my claims any modified forms of structure or use of mechanical equivalents which may be reasonably included within their scope.

I claim as my invention:

1. In a heating plate structure, a plate element having a groove in the bottom thereof, a heating element in said groove, means to retain said element therein, terminals for said heating element and circuit connections between said heating element and said terminals, said circuit connections including at the connection thereof to the heating element, an insulating bushing having a slot extending therethrough from side to side thereof and toward said groove, a cover plate of insulating material for said bushing between said bushing and the bottom of said groove, said bushing having a perforation extending at substantially right angles to said slot the portion of said bushing between said slot and said perforation being curved to avoid a sharp bend in said resistance wire when assembled in said slot and perforation.

2. In a heating plate structure, a plate element having a serpentine groove in the bottom thereof, a heating element in said groove, a cover plate to retain said element therein, insulation backing for said cover plate, a terminal clip supported by said heating plate structure, terminals carried thereby and circuit connections between said heating element and said terminals, said circuit connections including at the connection thereof to the heating element, an insulating bushing having a slot therethrough, one end of said slot extending toward said groove and the other extending at substantially right angles out of the groove and an insulating cover piece for the portion of said slot in said groove, said plate element having a socket receiving said cover piece and positioning it against lateral movement.

3. In a heating plate structure, a plate element having a heating element groove therein, a heating element in said groove, a cover for said groove and means for extending the end of said heating element through said cover and insulating it therefrom and from said plate element comprising a perforation in said cover, a shouldered bushing in said perforation and a slot in said bushing having ends within and without said cover plate and extending at substantially right angles to each other and an insulating cover piece for the portion of said slot in said groove, said plate element having a recess therein for receiving said cover piece, said plate element having a socket receiving said cover piece and positioning it against lateral movement.

4. In a heating plate structure, a plate element having a heating element groove therein, a heating element in said groove, a cover for said groove and means for extending the end of said heating element through said cover and insulating it therefrom and from said plate element comprising a perforation in said cover, a shouldered bushing in said perforation, an enlarged recess adjacent said perforation, said bushing having an other than round head received in said recess and retained against turning thereby and a slot in said bushing having opposite ends within said cover plate and a perforation extending therethrough at substantially right angles to said slot.

5. In a heating plate structure, a plate element having a heating element groove therein, a heating element in said groove, a cover for said groove and means for extending the end of said heating element through said cover and insulating it therefrom and from said plate element comprising a perforation in said cover, a shouldered bushing in said perforation, an enlarged recess adjacent said perforation, said bushing having an other than round head received in said recess and retained against turning thereby and a slot in said bushing having opposite ends within said cover plate and a perforation extending therethrough at substantially right angles to said slot, an insulating cover piece for the portion of said slot in said groove, said plate element having an other than round recess therein, said bushing having an other than round portion to enter said recess and be both retained thereby against turning and against lateral movement relative to said plate element.

6. In a heating plate structure, a plate element having a groove in the bottom thereof, a heating element in said groove, means to retain said heating element therein, terminals for said heating element and circuit connections between said heating element and said terminals, said circuit connections including at the connection thereof to the heating element an insulating bushing having a slot therethrough, one end of said slot extending toward said groove and the other extending at substantially right angles to said groove, and an insulating cover piece for the portion of said slot in said groove, said plate element having a socket receiving said cover piece and positioning it against lateral movement.

7. In a heating plate structure, a plate element having a serpentine groove therein, a heating element embedded in said groove, a cover plate to retain said heating element therein, terminals for said heating element and circuit connections between said heating element and said terminals, said circuit connections including at the connections thereof to the heating element a bushing of insulating material embedded in said plate element and having a slot extending therethru from side to side thereof and toward said groove, a cover plate of insulating material for said bushing, said bushing having a perforation extending at substantially right angles to said slot, the portion of said bushing between said slot and said perforation being curved to avoid a sharp bend in a resistance wire when assembled in said slot and perforation.

HOWARD A. SMITH.